United States Patent
Hirano et al.

(10) Patent No.: US 8,671,354 B2
(45) Date of Patent: Mar. 11, 2014

(54) PLAYER STREAKS AND GAME DATA VISUALIZATION

(75) Inventors: Kelly Hirano, Cupertino, CA (US); Eric Bogs, West Hollywood, CA (US); Scott B. Ware, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1622 days.

(21) Appl. No.: 11/644,670

(22) Filed: Dec. 22, 2006

(65) Prior Publication Data

US 2008/0155436 A1 Jun. 26, 2008

(51) Int. Cl.
*G06F 3/048* (2013.01)
*G06F 17/00* (2006.01)
*G06F 3/00* (2006.01)

(52) U.S. Cl.
USPC ............ 715/764; 715/866; 715/227; 715/228

(58) Field of Classification Search
USPC .................................. 715/764, 227, 866, 228
See application file for complete search history.

(56) References Cited

U.S. PATENT DOCUMENTS

| | | | |
|---|---|---|---|
| 5,583,763 A | 12/1996 | Atcheson et al. | |
| 5,771,378 A | 6/1998 | Holt et al. | |
| 6,169,992 B1 | 1/2001 | Beall et al. | |
| 6,327,590 B1 | 12/2001 | Chidlovskii et al. | |
| 6,446,065 B1 | 9/2002 | Nishioka et al. | |
| 6,687,734 B1 | 2/2004 | Sellink et al. | |
| 6,701,311 B2 | 3/2004 | Biebesheimer et al. | |
| 6,785,670 B1 | 8/2004 | Chiang et al. | |
| 6,789,073 B1 | 9/2004 | Lunenfeld | |
| 6,822,650 B1 * | 11/2004 | Davis et al. .................. | 345/441 |
| 6,961,731 B2 | 11/2005 | Holbrook | |
| 7,050,868 B1 | 5/2006 | Graepel et al. | |
| 7,058,626 B1 | 6/2006 | Pan et al. | |
| 7,762,878 B2 | 7/2010 | Nicholas et al. | |
| 7,867,080 B2 * | 1/2011 | Nicely et al. .................. | 463/25 |
| 2002/0062247 A1 | 5/2002 | Allen | |
| 2002/0107073 A1 | 8/2002 | Binney | |
| 2003/0054885 A1 | 3/2003 | Pinto et al. | |
| 2003/0203757 A1 | 10/2003 | Chanda et al. | |
| 2004/0025180 A1 | 2/2004 | Begeja et al. | |

(Continued)

OTHER PUBLICATIONS

Streak definition , Merriam-Webster, Webster's Ninth New Collegiate Dictionary, 1991.*

(Continued)

*Primary Examiner* — Tadeese Hailu
*Assistant Examiner* — Darrin Hope
(74) *Attorney, Agent, or Firm* — James J. DeCarlo; Greenberg Traurig, LLP (57) ABSTRACT

A computer based method visually highlights achievements of sports teams or players in displays of statistical data, such as statistical tables, that represent the performance of sports teams or players. The achievements to be highlighted may include multiple-game streaks and single-game achievements. Multiple-game streaks occur when a team or player meets a performance objective in multiple consecutive games. Such streaks are highlighted in displays of statistical data by visually emphasizing the data values that form the streak. Visual emphasis is achieved by, for example, displaying a visual indicator, such as a line, adjacent to the data values. A single-game achievement is highlighted by visually emphasizing the data value that represents the achievement, so that users can quickly identify single-game achievements in statistical tables. Details about the streak or achievement may be displayed when the user selects or passes a mouse pointer over one of the data values or over the visual indicator.

19 Claims, 7 Drawing Sheets

| | 400 | 401 | 402 | | 404 | | | | | | | | | |
|---|---|---|---|---|---|---|---|---|---|---|---|---|---|---|
| Date | Opponent | Result | G | A | Pts | +/- | PIM | PPG | PPA | SHG | SHA | GW | GT | SOG | Pct |
| Mar 30 | PHO | L 2-5 | 0 | 0 | 0 | -2 | 0 | 0 | 0 | 0 | 0 | 0 | 0 | 1 | .000 |
| Mar 28 | @ COB | L 1-4 | 0 | 0 | 0 | -1 | 0 | 0 | 0 | 0 | 0 | 0 | 0 | 2 | .000 |
| Mar 26 | @ CHI | W 5-4 | 0 | 1 | 1 | 2 | 0 | 0 | 0 | 0 | 0 | 0 | 0 | 9 | .000 |
| Mar 25 | @ MIN | W 5-1 | 2 | 1 | 3 | 2 | 2 | 0 | 1 | 0 | 0 | 0 | 0 | 6 | .333 |
| Mar 23 | @ DET | L 0-4 | 0 | 0 | 0 | -1 | 4 | 0 | 0 | 0 | 0 | 0 | 0 | 1 | .000 |
| Mar 21 | @ STL | W 6-0 | 1 | 1 | 2 | 3 | 0 | 0 | 0 | 0 | 0 | 1 | 0 | 4 | .250 |
| Mar 19 | COL | W 6-5 | 1 | 0 | 1 | 0 | 0 | 0 | 0 | 0 | 0 | 0 | 0 | 5 | .200 |
| Mar 18 | DAL | OTL 3-4 | 0 | 0 | 0 | -1 | 2 | 0 | 0 | 0 | 0 | 0 | 0 | 3 | .000 |
| Mar 16 | STL | W 5-2 406 | 1 | 0 | 1 | 2 | 2 | 0 | 0 | 0 | 0 | 0 | 0 | 5 | .200 |
| Mar 13 | LOS | W 4-3 | 3 | 0 | 3 | 1 | 0 | 0 | 0 | 1 | 0 | 1 | 0 | 5 | .600 |
| Mar 11 | NAS 412 | W 3-2 | 1 | 0 | 1 | 1 | 0 | 0 | 0 | 0 | 0 | 0 | 0 | 6 | .167 |
| Mar 9 | EDM | W 5-2 408 | 0 | 1 | 1 | 0 | 0 | 0 | 0 | 0 | 0 | 0 | 0 | 2 | .000 |
| Mar 7 | @ ANA | OTL 4-5 | 1 | 1 | 2 | 0 | 0 | 1 | 0 | 0 | 0 | 0 | 0 | 5 | .200 |
| Mar 4 | @ CGY | L 0-2 | 0 | 0 | 0 | 410 0 | 0 | 0 | 0 | 0 | 0 | 0 | 0 | 2 | .000 |

(56) References Cited

U.S. PATENT DOCUMENTS

| | | | |
|---|---|---|---|
| 2004/0110552 A1 | 6/2004 | Del Prado | |
| 2005/0001837 A1 | 1/2005 | Shannon | |
| 2005/0159220 A1 | 7/2005 | Wilson et al. | |
| 2005/0160080 A1 | 7/2005 | Dawson | |
| 2006/0026013 A1 | 2/2006 | Kraft | |
| 2006/0040719 A1 | 2/2006 | Plimi | |
| 2006/0074853 A1 | 4/2006 | Liu et al. | |
| 2006/0183548 A1 | 8/2006 | Morris et al. | |
| 2006/0217198 A1 | 9/2006 | Johnson | |
| 2006/0252476 A1 | 11/2006 | Bahou | |
| 2006/0258421 A1 | 11/2006 | Nicholas et al. | |
| 2006/0288845 A1 | 12/2006 | Gale | |
| 2007/0113250 A1 | 5/2007 | Logan et al. | |
| 2007/0157595 A1 | 7/2007 | Lockwood | |
| 2007/0162850 A1 | 7/2007 | Adler et al. | |
| 2007/0185599 A1 | 8/2007 | Robinson et al. | |
| 2007/0191110 A1* | 8/2007 | Crouse | 463/43 |
| 2007/0203591 A1 | 8/2007 | Bowerman | |
| 2007/0233585 A1 | 10/2007 | Ben Simon et al. | |
| 2007/0245241 A1* | 10/2007 | Bertram et al. | 715/711 |
| 2008/0026804 A1 | 1/2008 | Baray et al. | |
| 2008/0096664 A1 | 4/2008 | Baray et al. | |
| 2008/0102911 A1 | 5/2008 | Campbell et al. | |
| 2008/0153589 A1 | 6/2008 | Baray et al. | |

OTHER PUBLICATIONS

Kinetikos.com.(2005). "Kinetiko's Graphical Standings for Major League Baseball 2005," located at <http://patmedia.net/tmoy/super-graph/Mlb2005 season.html> last visited on Feb. 7, 2007, 2 pages.
Kinetikos.com. (2005): "Kinetiko's Graphical Standings for Major League Baseball 2005," located at <http://patmedia.net/tmoy/super-graph/Mlb2005.html>, last visited on Feb. 7, 2007, 2 pages.
Kinetikos.com. (2005). "Major League Baseball Playoff P1CTURE2005," located at <http://patmedia.net/tmoy/super-graph/Mlb2005playoff.html>, last visited on Feb. 7, 2007, 2 pages.
Kinetikos.com. (2005). "Understanding Sports Super Graphs: Step 1—The Basics," located at <http://patmedia.net/tmoy/super-graph/spexp1.html>, last visited on Feb. 7, 2007, 1 page.
Kinetikos.com. (2005). "Understanding Sports Super Graphs: Step 2—Ranges," located at <http://patmedia.net/tmoy/super-graph/spexp2.html>, last visited on Feb. 7, 2007, 1 page.
Kinetikos.com. (2005). "Understanding Sports Super Graphs: Step 3—Time," located at <http://patmedia.net/tmoy/super-graph/spexp3.html>, last visited on Feb. 7, 2007, 1 page.
U.S. Appl. No. 11/495,087, filed Jul. 28, 2006, for Baray et al.
U.S. Appl. No. 11/589,005, filed Oct. 27, 2006, for Campbell, III et al.
U.S. Appl. No. 11/644,170, filed Dec. 22, 2006, for Baray et al.
U.S. Appl. No. 11/495,074, filed Jul. 28, 2006, for Baray et al.
MyFantasyLeague.com 2005 Help Manual, published by Sideline Software Inc. on Aug. 23, 2005 http://web.archive.org/web/20050910080106/http://www.myfantasyleague.com/help/mfl2005.pdf.
"Draft Coach: A First in Fantasy Football" article written by Tony Holm, published on Jul. 8, 2003 http://www.fantasysharks.com/artman2/publish/Draft_Coach_A_first_in_Fantasy_Football_70.htm.
"FAQ" published by Fantasy Football League Manager—CBS SportsLine.com on Dec. 11, 2005 http://web.archive.org/web/20051211092739/football.sportsline.com/splash/football/spin/mdmt/faq.
Almieda, R.B. et al. (2004) "A Community-Aware Search Engine", WWW204, New York, NY May 17-22, 2004, pp. 413-421.
"Fantasty Football Lineup Analyzer—Tips for Who to Start & Who to Bench Each Week", Jul. 17, 2006 http://web.archive.org/web/200607171633529/www.fantasyfootballstarters.com/lineupAnalyzer.jsp, retrieved on Feb. 10, 2009, 1 pg.
Bharat, K. SearchPad: Explicit Capture of Search Context to Support Web Search http://www9.org/w9cdrom/173/173.html, retrieved on Aug. 1, 2007, 13 pgs.
Budzik, J. et al. "User Interactions with Everyday Applications as Context for Just-in-Time Information Access", Proceeding of the 2000 Conference on Intelligent Users Interfaces, 8 pgs.
Finkelstein, L. et al. "Placing Search in Context: The Concept Revisited", WWW10, Hong Kong, May 2-5, 2001, pp. 406-414.
Freyne, J. et al. "Further Experiments on Collaborative Ranking in Community-Based Web Search", Artificial Intelligence Review, pp. 1-23 (2004).
Lieberman, H. "Letizia: An Agent that Assists Web Browsing", Proceedings of the Fourteenth International Joint Conference on Artificial Intelligence, Aug. 20-25, 1995, 6 pgs.
Mitra, M. et al., "Improving Automatic Query Expansion", Proceedings of the AMC SIGIR, 9 pgs.
Rhodes, B.J. et al., "Remembrance Agent: A Continuously Running Automated Information Retrieval System ", Proceedings of the First International Conference on the Practical Application of Intelligent Agents and Multi Agent Technology (PAAM), pp. 487-495 (1996) http://www.cc.gatech.edu/fac/Thad.Starner/p/031_40_agents&ubicomp/remembrance-agent . . . retrieved on Aug. 1, 2007, 6 pgs.
MyFantasyLeague Fantasy Football Management—Features, Jul. 16, 2006 http://web.archive.org/web/20060716072900/www.myfantasyleague.com/features.htm, retrieved Feb. 10, 2009.
Sansbury, C. "Yahoo! Widget for BBC Sports News—Scotland", Sep. 13, 2005 http://widgets.yahoo/gallery/view.php?widget=37220, retrieved Nov. 13, 2006, 1 pg.
Yahoo! Inc., "Yahoo! Widget Engine 3.0 Reference Manual Version 3.0", Dec. 7, 2005, 299 pgs.
"PuppyWar" by puppywar.com, Jun. 4, 2005 http://web.archive.org/web/20050604005252/http://puppywar.com/.
Kittenwar.com, "Kitten War! May the Cutest Kitten Win!" http://kittenwar.com, retrieved Feb. 1, 2006, 8 pgs.
http://web.archive.org/web/20050930200754/www.fanball.com/commissioner/index.cfm, fanball.com, Sep. 24, 2005.
http://web.archive.org/web/20060309062600/football.myfantasyleague.com/2003/player?L=30078&P=3207, Search for All News Articles on Holmes, Priest KCC RB Now!, Oct. 25 2005.
http://web.archive.org/web/20100703021333/http://footb...9.myfantasyleague.com/2003/options?L=30078&0=07&F=0007, MyFantasyLeague.com Demo Rosters, Oct. 25, 2005.
http://web.archive.org/web/20100703021333/http://footba1199.myfantasyleague.com/2003/player?L=30078&P=3865, MyFantasyLeague.com Demo Couch, Tim CLE QB, Oct. 25, 2005.
http://web.archive.org/web/20051026110900/www.myfantasyleague.com/whatsnew2005.htm, What's New, Oct. 25, 2005.
http://web.archive.org/web/20051105005315/football.myfantasyleague.com/2003/home/30078, MyFantasyLeague.com Demo, Oct. 25, 2005.
http://www.archive.org/web/20051202110508/football.myfantasyleague.com/2003/injury?L=30078, MyFantasyLeague.com Demo Injury Report, Oct. 25, 2005.
Official Action issued in connection with U.S. Appl. No. 11/644,170 mailed Mar. 2, 2011.
Official Action issued in connection with U.S. Appl. No. 11/495,087 mailed Mar. 10, 2011.
Official Action issued in connection with U.S. Appl. No. 11/495,087 mailed Mar. 2, 2009.
Official Action issued in connection with U.S. Appl. No. 11/495,074 mailed May 12, 2011.
Official Action issued in connection with U.S. Appl. No. 11/495,074 mailed Aug. 19, 2010.
Official Action issued in connection with U.S. Appl. No. 11/495,074 mailed Feb. 24, 2009.
Official Action issued in connection with U.S. Appl. No. 11/347,517 mailed Jan. 21, 2011.
Official Action issued in connection with U.S. Appl. No. 11/347,517 mailed Dec. 18, 2009.
Official Action issued in connection with U.S. Appl. No. 11/347,517 mailed Aug. 6, 2009.
Official Action issued in connection with U.S. Appl. No. 11/589,005 mailed May 12, 2011.
Official Action issued in connection with U.S. Appl. No. 11/589,005 mailed Jan. 20, 2011.
Official Action issued in connection with U.S. Appl. No. 11/589,005 mailed Jul. 12, 2010.
Official Action issued in connection with U.S. Appl. No. 11/644,170 mailed Sep. 19, 2011.

\* cited by examiner

| 200 | Date | Mar 21 | Mar 19 | Mar 16 | Mar 13 | Mar 11 | Mar 9 | Mar 7 |
|---|---|---|---|---|---|---|---|---|
| 202 | | | | | | | | |
| 204 | Opponent | CHI | DAL | STL | LOS | NAS | EDM | @ ANA |
| 206 | Result | W 5-4 | OTL 3-4 | W 5-2 | W 4-2 | W 3-2 | W 5-2 | OTL 4-5 |
| 208 | G | 1 | 214→ 0 218→ | 1 | 209→ 3 | 1 | 209→ 0 | 1 |
| 210 | A | 0 | 0 | 0 | 0 | 0 | 1 | 1 |
| 212 | Pts | 0 | 224→ 0 228→ | 1 | 3 | 1 | 1 | 2 |

| Date | Opponent | Result | G | A | Pts | +/- | PIM | PPG | PPA | SHG | SHA | GW | GT | SOG | Pct |
|---|---|---|---|---|---|---|---|---|---|---|---|---|---|---|---|
| Mar 30 | PHO | L 2-5 | 0 | 0 | 0 | -2 | 0 | 0 | 0 | 0 | 0 | 0 | 0 | 1 | .000 |
| Mar 28 | @ COB | L 1-4 | 0 | 0 | 0 | -1 | 0 | 0 | 0 | 0 | 0 | 0 | 0 | 2 | .000 |
| Mar 26 | @ CHI | W 5-4 | 0 | 1 | 1 | 2 | 0 | 0 | 0 | 0 | 0 | 0 | 0 | 9 | .000 |
| Mar 25 | @ MIN | W 5-1 | 2 | 1 | 3 | 2 | 2 | 0 | 1 | 0 | 0 | 0 | 0 | 6 | .333 |
| Mar 23 | @ DET | L 0-4 | 0 | 0 | 0 | -1 | 4 | 0 | 0 | 0 | 0 | 0 | 0 | 1 | .000 |
| Mar 21 | @ STL | W 6-0 | 1 | 1 | 2 | 3 | 0 | 0 | 0 | 0 | 0 | 1 | 0 | 4 | .250 |
| Mar 19 | COL | W 6-5 | 1 | 0 | 1 | 0 | 0 | 0 | 0 | 0 | 0 | 0 | 0 | 5 | .200 |
| Mar 18 | DAL | OTL 3-4 | 0 | 0 | 0 | -1 | 2 | 0 | 0 | 0 | 0 | 0 | 0 | 3 | .000 |
| Mar 16 | STL | W 5-2 | 1 | 0 | 1 | 2 | 2 | 0 | 0 | 0 | 0 | 0 | 0 | 5 | .200 |
| Mar 13 | LOS | W 4-3 | 3 | 0 | 3 | 1 | 0 | 0 | 0 | 0 | 1 | 1 | 0 | 5 | .600 |
| Mar 11 | NAS | W 3-2 | 1 | 0 | 1 | 1 | 0 | 0 | 1 | 0 | 0 | 0 | 0 | 6 | .167 |
| Mar 9 | EDM | W 5-2 | 0 | 1 | 1 | 0 | 0 | 0 | 0 | 0 | 0 | 0 | 0 | 2 | .000 |
| Mar 7 | @ ANA | OTL 4-5 | 1 | 1 | 2 | 0 | 0 | 1 | 0 | 0 | 0 | 0 | 0 | 5 | .200 |
| Mar 4 | @ CGY | L 0-2 | 0 | 0 | 0 | 0 | 0 | 0 | 0 | 0 | 0 | 0 | 0 | 2 | .000 |

FIG. 3

| Date | Opponent | Result | G | A | Pts | +/- | PIM | PPG | PPA | SHG | SHA | GW | GT | SOG | Pct |
|---|---|---|---|---|---|---|---|---|---|---|---|---|---|---|---|
| Mar 30 | PHO | L 2-5 | 0 | 0 | 0 | -2 | 0 | 0 | 0 | 0 | 0 | 0 | 0 | 1 | .000 |
| Mar 28 | @ COB | L 1-4 | 0 | 0 | 0 | -1 | 0 | 0 | 0 | 0 | 0 | 0 | 0 | 2 | .000 |
| Mar 26 | @ CHI | W 5-4 | 0 | 1 | 1 | 2 | 0 | 0 | 0 | 0 | 0 | 0 | 0 | 9 | .000 |
| Mar 25 | @ MIN | W 5-1 | 2 | 1 | 3 | 2 | 2 | 0 | 0 | 0 | 0 | 0 | 0 | 6 | .333 |
| Mar 23 | @ DET | L 0-4 | 0 | 0 | 0 | -1 | 4 | 1 | 0 | 0 | 0 | 0 | 0 | 1 | .000 |
| Mar 21 | @ STL | W 6-0 | 1 | 1 | 2 | 3 | 0 | 0 | 0 | 0 | 0 | 1 | 0 | 4 | .250 |
| Mar 19 | COL | W 6-5 | 1 | 0 | 1 | 0 | 0 | 0 | 0 | 0 | 0 | 0 | 0 | 5 | .200 |
| Mar 18 | DAL | OTL 3-4 | 0 | 0 | 0 | -1 | 2 | 0 | 0 | 0 | 0 | 0 | 0 | 3 | .000 |
| Mar 16 | STL | W 5-2 | 1 | 0 | 1 | 2 | 2 | 0 | 0 | 0 | 0 | 0 | 0 | 5 | .200 |
| Mar 13 | LOS | W 4-3 | 3 | 0 | 3 | 1 | 0 | 0 | 1 | 0 | 0 | 1 | 0 | 5 | .600 |
| Mar 11 | NAS | W 3-2 | 1 | 0 | 1 | 1 | 0 | 0 | 0 | 0 | 0 | 0 | 0 | 6 | .167 |
| Mar 9 | EDM | W 5-2 | 1 | 1 | 2 | 0 | 1 | 0 | 0 | 0 | 0 | 0 | 0 | 2 | .000 |
| Mar 7 | @ ANA | OTL 4-5 | 1 | 1 | 2 | 0 | 0 | 0 | 0 | 0 | 0 | 0 | 0 | 5 | .200 |
| Mar 4 | @ CGY | L 0-2 | 0 | 0 | 0 | 0 | 0 | 0 | 0 | 0 | 0 | 0 | 0 | 2 | .000 |

FIG. 4A

| Date | Opponent | Result | G | A | Pts | +/- | PIM | PPG | PPA | SHG | SHA | GW | GT | SOG | Pct |
|------|----------|--------|---|---|-----|-----|-----|-----|-----|-----|-----|-----|----|-----|------|
| Mar 30 | PHO | L 2-5 | 0 | 0 | 0 | -2 | 0 | 0 | 0 | 0 | 0 | 0 | 0 | 1 | .000 |
| Mar 28 | @ COB | L 1-4 | 0 | 0 | 0 | -1 | 0 | 0 | 0 | 0 | 0 | 0 | 0 | 2 | .000 |
| Mar 26 | @ DAL | W 5-1 | 0 | 1 | 1 | 2 | 0 | 0 | 0 | 0 | 0 | 0 | 0 | 9 | .000 |
| Mar 25 | @ MIN | W 5-1 | 2 | 1 | 3 | 2 | 2 | 0 | 1 | 0 | 0 | 0 | 0 | 6 | .333 |
| Mar 23 | @ DET | L 0-4 | 0 | 0 | 0 | -1 | 0 | 0 | 0 | 0 | 0 | 0 | 0 | 1 | .000 |
| Mar 21 | @ STL | W 6-0 | 1 | 0 | 1 | 2 | 0 | 0 | 0 | 0 | 0 | 1 | 0 | 4 | .250 |
| Mar 18 | DAL | W 3-4 | 1 | 0 | 1 | -1 | 2 | 0 | 0 | 0 | 0 | 0 | 0 | 5 | .200 |
| Mar 16 | STL | W 5-2 | 1 | 0 | 1 | 2 | 2 | 0 | 0 | 0 | 0 | 0 | 0 | 3 | .000 |
| Mar 13 | LOS | W 4-3 | 3 | 0 | 3 | 2 | 0 | 1 | 0 | 0 | 0 | 1 | 0 | 5 | .600 |
| Mar 11 | NAS | W 3-2 | 1 | 0 | 1 | 0 | 0 | 0 | 0 | 0 | 0 | 0 | 0 | 5 | .200 |
| Mar 9 | EDM | W 5-2 | 1 | 1 | 2 | 0 | 0 | 0 | 0 | 0 | 0 | 0 | 0 | 6 | .167 |
| Mar 7 | @ ANA | OTL 4-5 | 0 | 0 | 0 | 0 | 0 | 0 | 0 | 0 | 0 | 0 | 0 | 2 | .000 |
| Mar 4 | @ CGY | L 0-2 | 0 | 0 | 0 | 0 | 0 | 0 | 0 | 0 | 0 | 0 | 0 | 5 | .200 |
| | | | 0 | 0 | 0 | 0 | 0 | 0 | 0 | 0 | 0 | 0 | 0 | 2 | .000 |

PLAYER STREAKS AND GAME DATA VISUALIZATION

BACKGROUND OF THE INVENTION

In the world of sports, many statistics are generated for each players in each game, and many games are played in a season. Yahoo!® Sports and other information sources typically display this statistical data and present it to the user as a listing or table of data values. Users may read this statistical data for a variety of reasons, e.g., to analyze the past performance of a sports team or player for the purpose of improving the future performance of a fantasy sports team. While the information a user is looking for may be present in the displayed data, it is often difficult to determine if a player is consistently doing well, or has achieved something statistically special in a given game.

Figure 3:
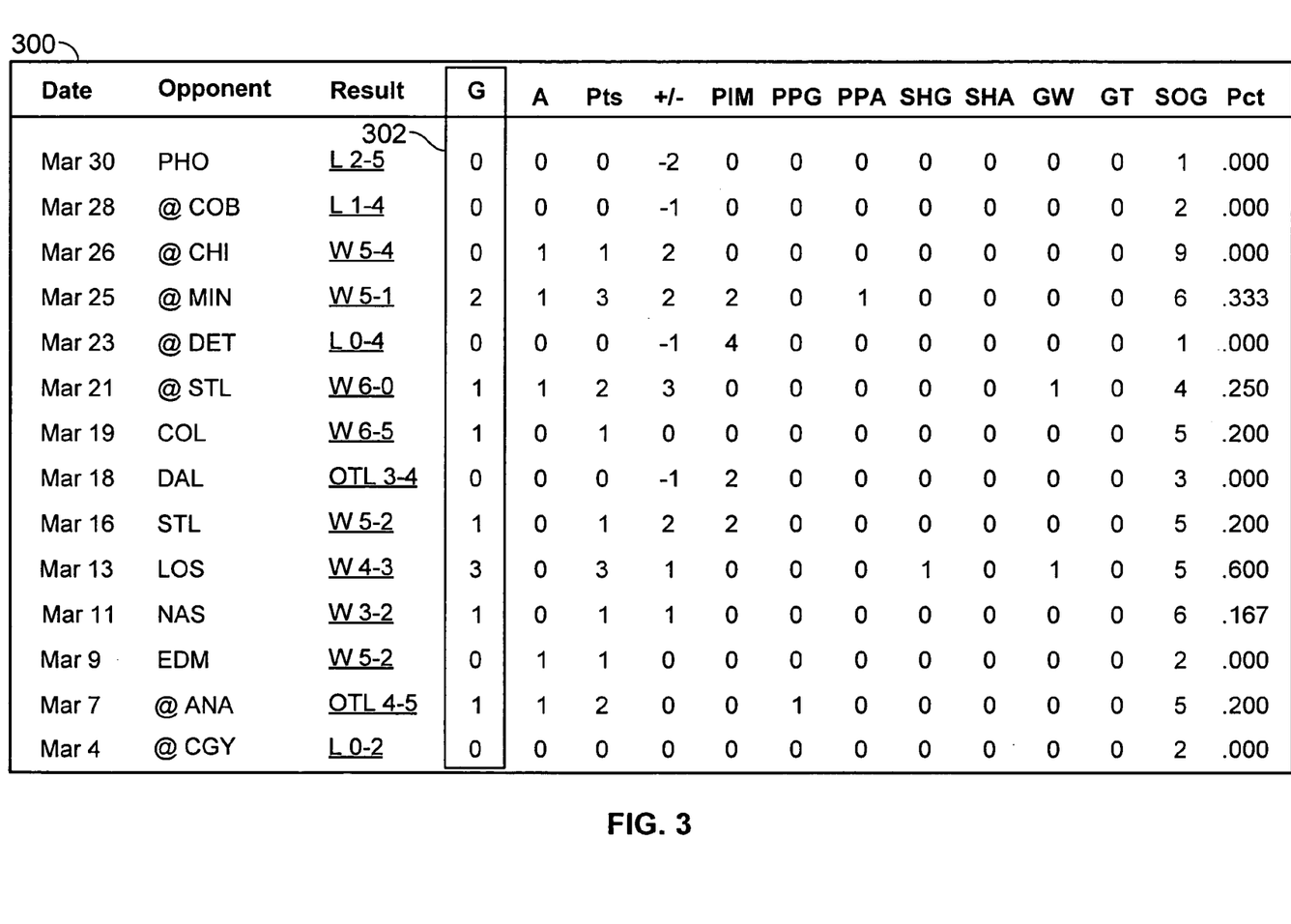
FIG. 3 is an illustrative drawing of a sports statistics display in accordance with some embodiments of the invention.

For example, FIG. 3 shows a listing of a National Hockey League (NHL) player's game statistics for the month of March. Because of the quantity of numerical information displayed, it is difficult to see what is important and when the player did well over a series of games. A user might be interested in knowing if the player ever went on a multi-game goal streak or if the player scored a hat trick (i.e., three goals in one game). A user looking at the table shown in FIG. 3 will probably have difficulty focusing on what is important; because nothing visually stands out in the table of data.

Furthermore, sports fans are often interested in statistical records, such as the longest goal streak in the NHL, the players that are currently on some sort of streak, the players that have done something statistically significant recently, and other numbers-driven achievements. Therefore, it would be desirable to display sports statistics in a way that visually emphasizes data that represents exceptional performance.

BRIEF SUMMARY OF THE INVENTION

In a first aspect, the invention features a computer-enabled method of displaying a statistical streak in a set of displayed data values to visually indicate achievement of a performance objective in at least two consecutive sports events in which a sports entity participates. The method includes the step of displaying an indicator that extends from a first position associated with a first data value to a second position associated with a second data value, where the first data value and the second data value meet a predetermined value for a particular statistical measure in two consecutive sports events. Embodiments of the invention may include one or more of the following features. The first data value and the second data value may meet the predetermined value if the first data value and the second data value are greater than the predetermined value. The first data value and the second data value may meet the predetermined value if the first data value and the second data value are equal to the predetermined value. The indicator may include a line segment extending from adjacent the first data value to adjacent the second data value. The set of displayed data values may be displayed in a table having columns and rows, where displaying an indicator includes the step of displaying a line segment adjacent to the column, where the line segment extends from adjacent the first data value to adjacent the second data value. The set of displayed data values may include data in a table having columns and rows, wherein displaying an indicator includes the step of displaying a line segment adjacent to the row, where the line segment extends from adjacent the first data value to adjacent the second data value. The step of displaying an indicator may include varying the visual appearance of the first data value and the second data value to distinguish the first data value and the second data value from other data values. The step of displaying an indicator may include varying the background color of the first data value and of the second data value to distinguish the first data value and the second data value from other data values. The method may include the step of displaying a description of the streak, where the description is visually associated with the indicator, and the description comprises the streak's length in time periods and a ranking of the streak's length relative to other streaks. The method may include the step of displaying the description of the streak in response to user selection of the first data value, the second data value, the indicator, or a combination thereof. The method may include the step of highlighting at least one data value, where the at least one data value represents the sports entity's performance according to a particular statistical measure in a sports event, and the at least one data value meets the predetermined value. Highlighting may include varying the visual appearance of the at least one data value based upon the performance objective. Highlighting may include varying the color of the at least one data value based upon the performance objective.

In a second aspect, the invention features a user interface for displaying a statistical streak in a set of displayed data values to visually indicate achievement of a performance objective in at least two consecutive sports events in which a sports entity participates, the at least two consecutive sports events including a first sports event and a second sports event. The user interface includes an indicator that extends from a first position associated with a first data value to a second position associated with a second data value, where the first data value represents the sports entity's performance in the first sports event, and the second data value represents the sports entity's performance in the second sports event, and where the first data value and the second data value meet a predetermined value for a particular statistical measure in two consecutive sports events. Embodiments of the invention may include one or more of the following features. The user interface may display a description of the streak, where the description is visually associated with the indicator, and wherein the description comprises the streak's length in time periods and a ranking of the streak's length relative to other streaks. The user interface may display the description in response to user selection of the streak. User selection of the streak may include a mouse click on one of the displayed data values, a mouse click on the indicator, a mouse over on one of the displayed data values, a mouse over on the indicator, selection of a point on the indicator, selection of a point on one of the displayed data values, or a combination thereof.

In a third aspect, the invention features a computer-readable medium comprising instructions for providing a user interface for displaying sports streaks, the instructions for causing performance of a method comprising the steps of displaying an indicator that extends from a first position associated with a first data value to a second position associated with a second data value, where the first data value and the second data value meet a predetermined value for a statistical measure in two consecutive sports events. Embodiments of the invention may include one or more of the following features. The first position may be within a predetermined distance of the first data value and the second position may be within a predetermined distance of the second data value. The method may include the step of highlighting at least one data value, where the at least one data value represents a sports entity's performance according to a particular statistical measure in a sports event, and the at least one data value meets a predetermined value.

DETAILED DESCRIPTION OF THE INVENTION

The following description is presented to enable any person skilled in the art to make and use the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

Figure 1A:
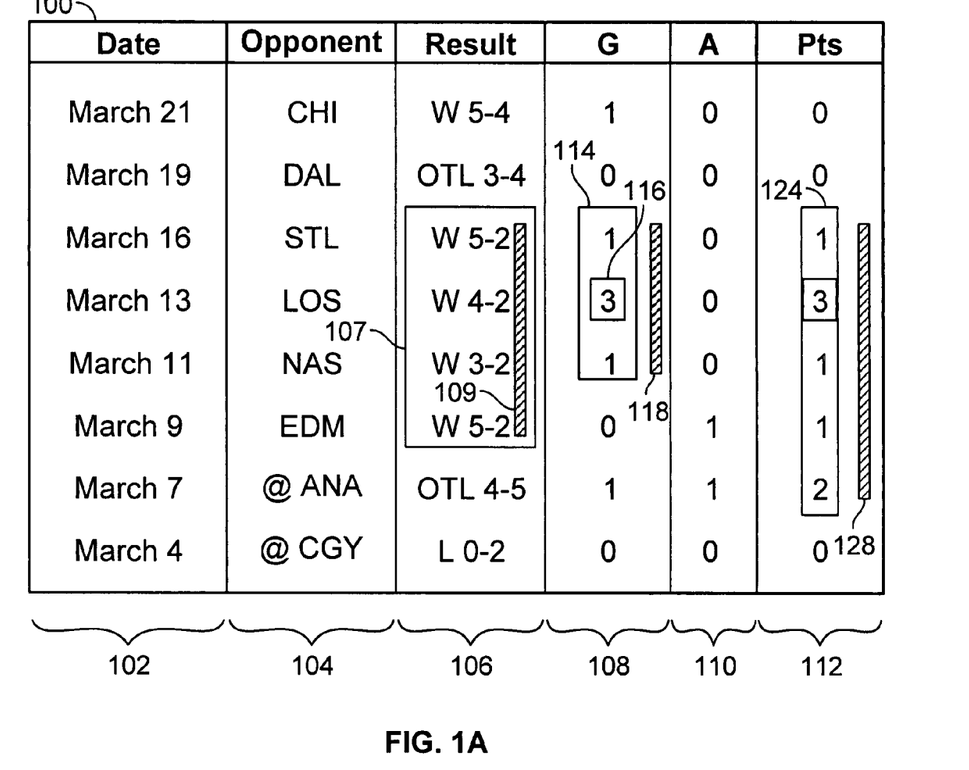
FIG. 1A is an illustrative drawing of streak indicators on a sports statistics display in accordance with some embodiments of the invention.

FIG. 1A is an illustrative drawing of streak indicators on a sports statistics display in accordance with some embodiments of the invention. A data table 100 shows statistics for a particular player in the month of March. Each row in the table 100 corresponds to a game. The data table 100 is typically displayed on a computer screen by an application program such as a web browser. A Date column 102 displays the date on which the game represented by a particular row was played. An Opponent column 104 displays the name of the opponent team for the game represented by the row. A Result column 106 displays the result, i.e., win (W), loss (L), or overtime loss (OTL). The game's score is also shown in the Result column 106. A Goals column 108 displays the number of goals scored in the game, an Assists column 110 shows the number of Assists scored in the game, and a Points column 112 shows the number of points scored in the game.

In one aspect, a single-game achievement is a statistical feat accomplished by satisfying a performance objective in a single game. The performance objective may be, for example, a hat trick (scoring three points), a triple-double (three different statistics with double-digit values), or any other objective that can be defined as a condition that is based upon data values. A single-game achievement of 3 goals in the game played on March 13 is shown in the Goals column 108. Single-game achievements are visually emphasized in the data table 100 by, for example, highlighting the data value that represents the achievement. Highlighting may be accomplished by displaying the value (e.g., "3") in a bold font, or by drawing a shape or border 116 around the data value, Highlighting may also be accomplished by varying the visual appearance of the data value based upon the performance objective. In one example, the color of the data value or the background color in an area surrounding the data value may be set to red to indicate a hat trick, and to green to indicate a triple double. In another example, highlighting may be accomplished by drawing a line segment within a defined distance of the first data value, e.g., within 20 pixels of the first data value. Any type of visual indicator or emphasis, including animation, or a distinct color, pattern, text property, or graphical overlay or underlay may serve as highlighting for a data value.

In one aspect. a streak is a series of two or more consecutive games played by a sports entity, e.g., a team or a player, in which the sports entity accomplishes a given statistical feat, i.e., satisfies a performance condition, such as scoring at least one point, or winning the game. In one aspect, a performance condition is a requirement that a data value meets a predetermined value. In one aspect, a data value meets a predetermined value if the data value is greater than or equal to the predetermined value. In another aspect, a data value meets a predetermined value if the data value is greater than the predetermined value. In still another aspect, a data value meets a predetermined value if the data value is equal to the predetermined value. For example, a typical performance condition for a scoring streak is that a score value meets the predetermined value 0, which is true if the score is greater than the predetermined value zero. In another example, a performance condition for a winning streak is that a Result value is equal to the predetermined value "Win."

Streaks may be highlighted on the data table 100 as the table 100 is displayed on a computer screen. Streaks and single-game achievements may be displayed for the same data set, if desired. FIG. 1A shows three exemplary streak indicators. A winning streak indicator 109 is displayed adjacent to a group 107 of four consecutive Win results. The Win results are consecutive because the games to which they correspond are consecutive. The four games occurred on March 9, 11, 13, and 16, and no other games in which this team occurred between the four games. The four games form a streak because a performance condition, winning the game, is satisfied in all of them. That is, the data value in the Result column of each of the four games meets, i.e., is equal to, the value "Win". Note that the rectangular border around the group 107 is shown for illustrative purposes and would not necessarily be shown on a computer display or generated by the methods described herein. A goal streak indicator 118 shows that the team was on a three-game goal streak from March 11 through March 16. The goal streak appears as a group 114 of three data values in the Goals column 108. A point streak indicator 128 shows that the team was on a five-game point streak from March 7 through March 16. The point streak appears as a group 124 of five data values in the Points column 112.

In one aspect, the streak indicator feature is displayed by drawing a visual feature 109 that extends from a first region associated with a first data value, e.g., "1" in the Goals column 108, to a second region associated with a second data value, e.g., "3", if the first data value and the second data value satisfy a performance condition. The streak indicator may be displayed as a line segment 109, or as any other shape that visually associates the data values that form the streak. As described above, for the winning streak indicator 109, the data values satisfy the condition that the sports entity (e.g., team) won the game. For the goals streak indicator 118 and the points streak indicator 125, the data values satisfy the condition that the values in the streak are greater than zero. Note that wins, goals, and points are examples of types of streaks that may occur in the game of hockey. Other types of streaks may occur in other games, where performance is measured by different statistics. For example, in baseball, a pitcher's strikeout streak may be measured by a group of strikeout statistical values, and a hitting streak would occur if a batter successfully recorded in hit in consecutive games.

A streak typically implies that a feat or achievement was accomplished in multiple successive, i.e., consecutive sports events, e.g., games, in which the team or player participates. The sports events themselves need not occur on consecutive days. The first data value and the second data value referred to above represent the sport's entity's performance according to a particular statistical measure in two consecutive sports events in which the sports entity participates, though the minimum number of consecutive events may vary for different streaks. The minimum number of consecutive events to establish a streak is referred to herein as a threshold number. The threshold number may be 2, in which case a streak occurs if the achievement is accomplished in two or more consecutive games. The threshold number may be greater than 2, e.g., 4, in which case a streak occurs if the achievement is accomplished in the threshold number, e.g., 4, of consecutive games or sports events.

In one aspect, when displaying the streak indicator 109 as described above, the first region is located within a defined distance of the first data value and the second region is located within the defined distance of the second data value. The defined distance may be measured in pixels or in distance units, e.g., 10 pixels or one-eighth of an inch. In other aspects, the streak indicator may overlap the data values, or may be displayed as an overlay on top of or an underlay beneath the data values, or may otherwise emphasize the data values, e.g., by using color blending to display the data value in a color produced by alpha-blending the streak indicator's color with the data value's original color. The streak indicator may also be displayed by changing, varying, or setting the visual appearance of the data values themselves, e.g., by setting the text color of the data values or the background color of the data values to a color different from that of data values that are not included in the streak.

Note that although the method of displaying the streak indicator is described here in terms of a first data value and a second data value, the method can be used to display a streak indicator for any number of data values. For example, the method may be repeated for each data value in a set of an arbitrary number of data values. The streak indicator would join or connect regions near each data value, e.g., to form a line that passes nearby each data value, or a shape that encloses all data values in the streak.

In one aspect, shown in the example of FIG. 1A, the performance objective may be defined so that it is satisfied if the first data value and the second data value are greater than zero. Any other condition appropriate for the type of data values may be used. For example, when measuring hits allowed by a pitcher in baseball, a streak in which the pitcher allowed no hits may be displayed using a performance condition that is satisfied if the hits allowed value is zero. In another example, the performance objective may be defined so that it is satisfied if the first data value and the second data value are equal, which allows streaks in which the same value occurs, such as winning streaks or losing streaks. A combination may also be used, e.g., a condition that is satisfied when the data values are greater than zero and equal.

In one aspect, a set of displayed data values may be displayed in a column-oriented format, in which case displaying the streak indicator involves displaying a vertical line segment 118 adjacent to the column 108, where the line segment extends from the first data value "1" in the March 16 row to the second data value "3" (and to any other data values in the streak, such as the value "1" in the March 11 row). The line segment 118 is adjacent to the first data value "1" and to the second data value "3" (and to any other data values in the streak).

Figure 1B:
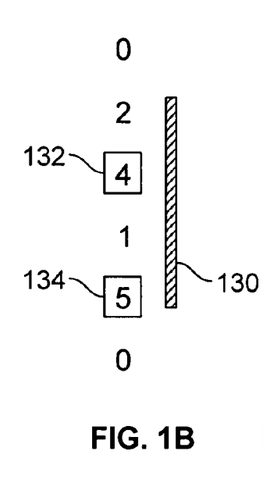
FIGS. 1B-1F are illustrative drawings of streak indicators in accordance with some embodiments of the invention.
Figure 1C:
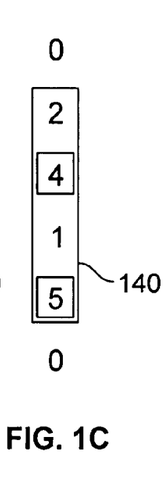
Figures 1D, 1E:
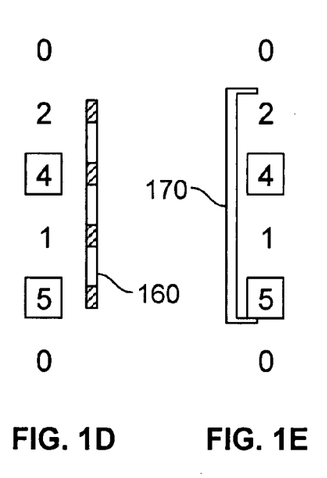
Figure 1F:
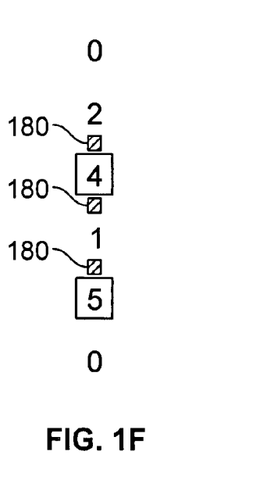

FIGS. 1B-1F are illustrative drawings of streak indicators in accordance with some embodiments of the invention. Although the streak indicators 109, 118, 128 are shown as solid lines in FIG. 1A, streak indicators can be displayed using any visual representation that associates multiple data values. FIG. 1B shows a four-game streak indicator 130, which is a line, and single-game achievements highlighted using borders 132, 134. FIG. 1C shows a four-game streak indicator 140, which is a border around the region defined by the four data values that form the streak. FIG. 1D shows a four-game streak indicator 160, which is a line filled with a pattern of alternating colors. FIG. 1E shows a four-game streak indicator 170, which is a line with right angles that delineate the ends of the streak in the data table. FIG. 1F shows a four-game streak indicator 180, which includes blocks displayed between the data values that form the streak in the data table.

Figure 2A:
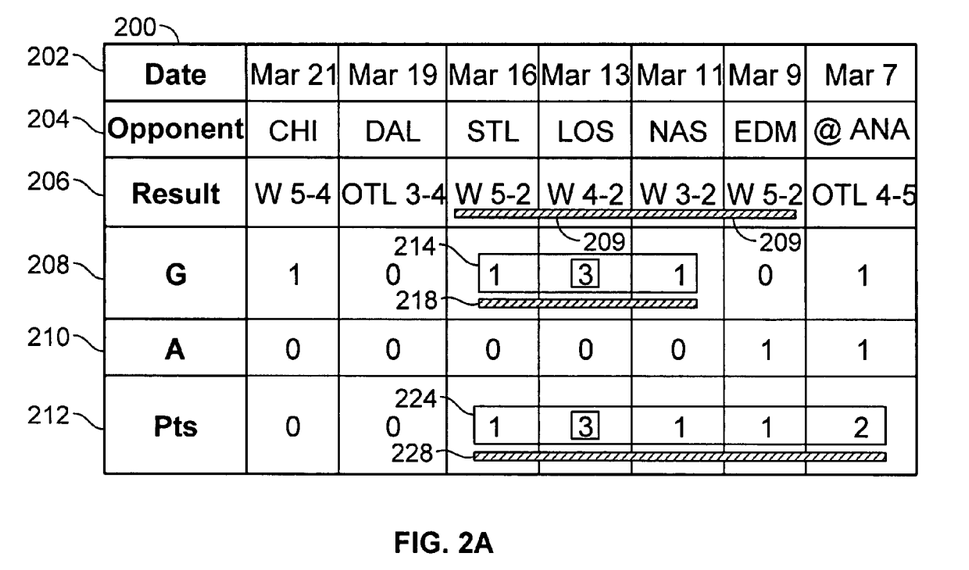
FIG. 2A is an illustrative drawing of horizontally-oriented streak indicators on a sports statistics display in accordance with some embodiments of the invention.

FIG. 2A is an illustrative drawing of horizontally-oriented streak indicators on a sports statistics display in accordance with some embodiments of the invention. In one aspect, the set of data values is data in a row-oriented format, in which case displaying the streak indicator involves displaying a horizontal line segment 218 adjacent to a row 208, where the line segment extends from the first data value "1" in the March 16 column to the second data value "3" in the March 13 column (and to any other data values in the streak, such as the value "1" in the March 11 column). The line segment 218 is adjacent to the first data value "1" and to the second data value "3" (and to any other data values in the streak).

Figure 2B:
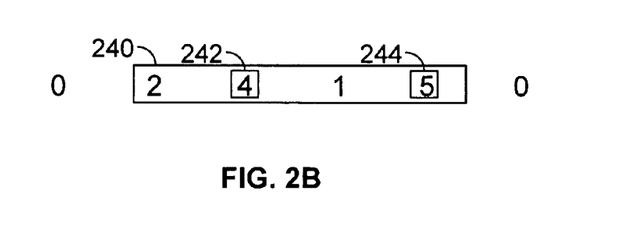
FIG. 2B is an illustrative drawing of a horizontally-oriented streak indicator in accordance with some embodiments of the invention.

FIG. 2B is an illustrative drawing of a horizontally-oriented streak indicator in accordance with some embodiments of the invention. A shape 240 is drawn around the four data values that form the streak.

FIG. 3 is an illustrative drawing of a sports statistics display in accordance with some embodiments of the invention. A data table 300 includes a Goal column 302 of data values that represent the number of goals scored in a game associated with each row of data. For example, the first row indicates that zero goals were scored on March 30.

Figure 4A:
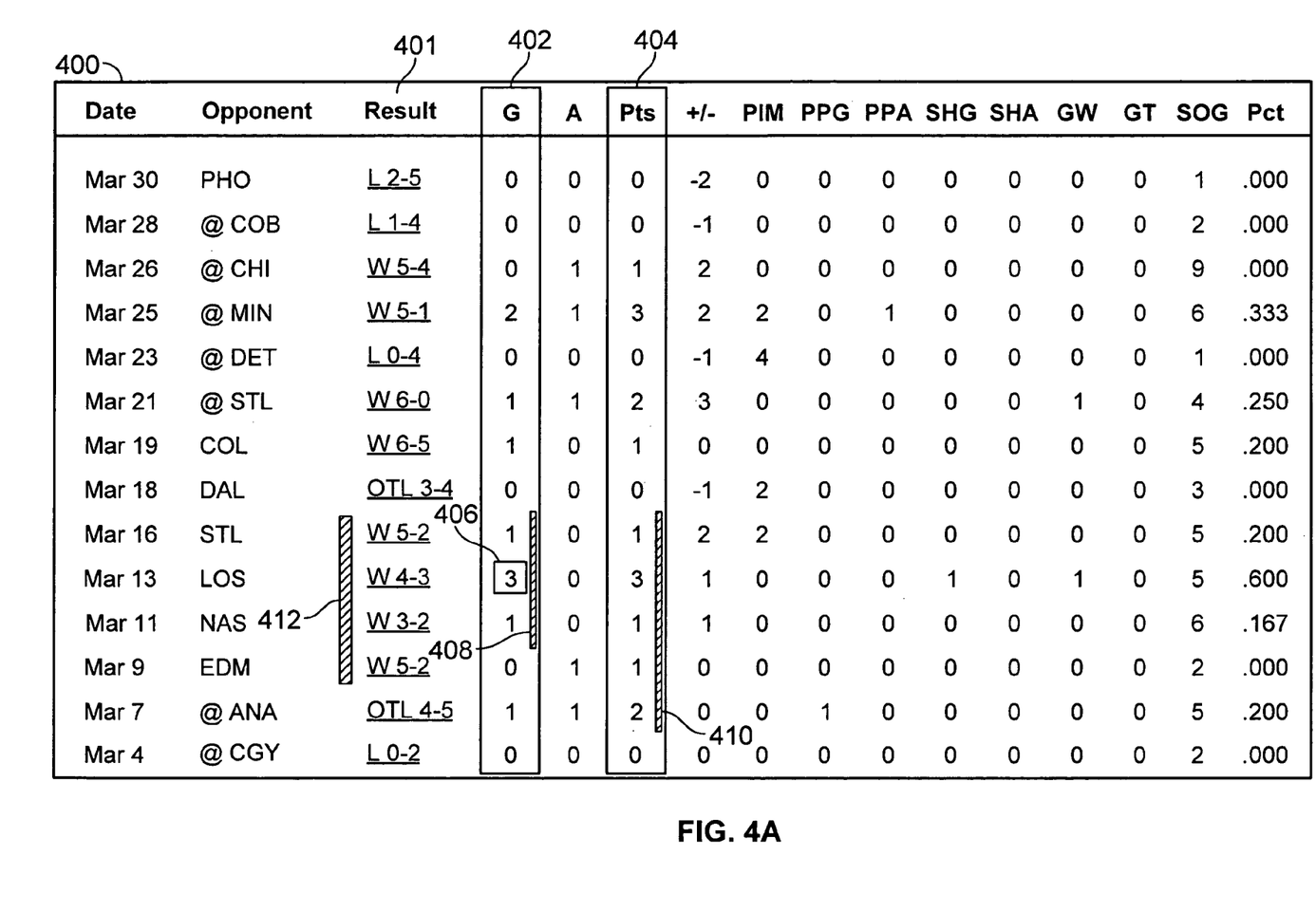
FIG. 4A is an illustrative drawing of streaks indicators and single-game achievement highlighting in accordance with some embodiments of the invention.

FIG. 4A is an illustrative drawing of streaks indicators and single-game achievement highlighting in accordance with some embodiments of the invention. A data table user interface 400 includes a Result column 401, a Goal column 402, and a Points column 404. A streak indicator 412 is displayed adjacent to the Results column 401 to indicate that a four-game winning streak occurred from March 9 to March 16. A single-game achievement is shown by a highlighted feature 406 in the Goal column 402. The highlighting 406 around the value "3" indicates that the highlighted value is a hat trick. A three-game goal streak is indicated by a goal streak indicator 408, and a five-game points streak is indicated by a points streak indicator 410. These streak indicators are similar to the streak indicators shown in FIG. 1A.

Figure 4B:
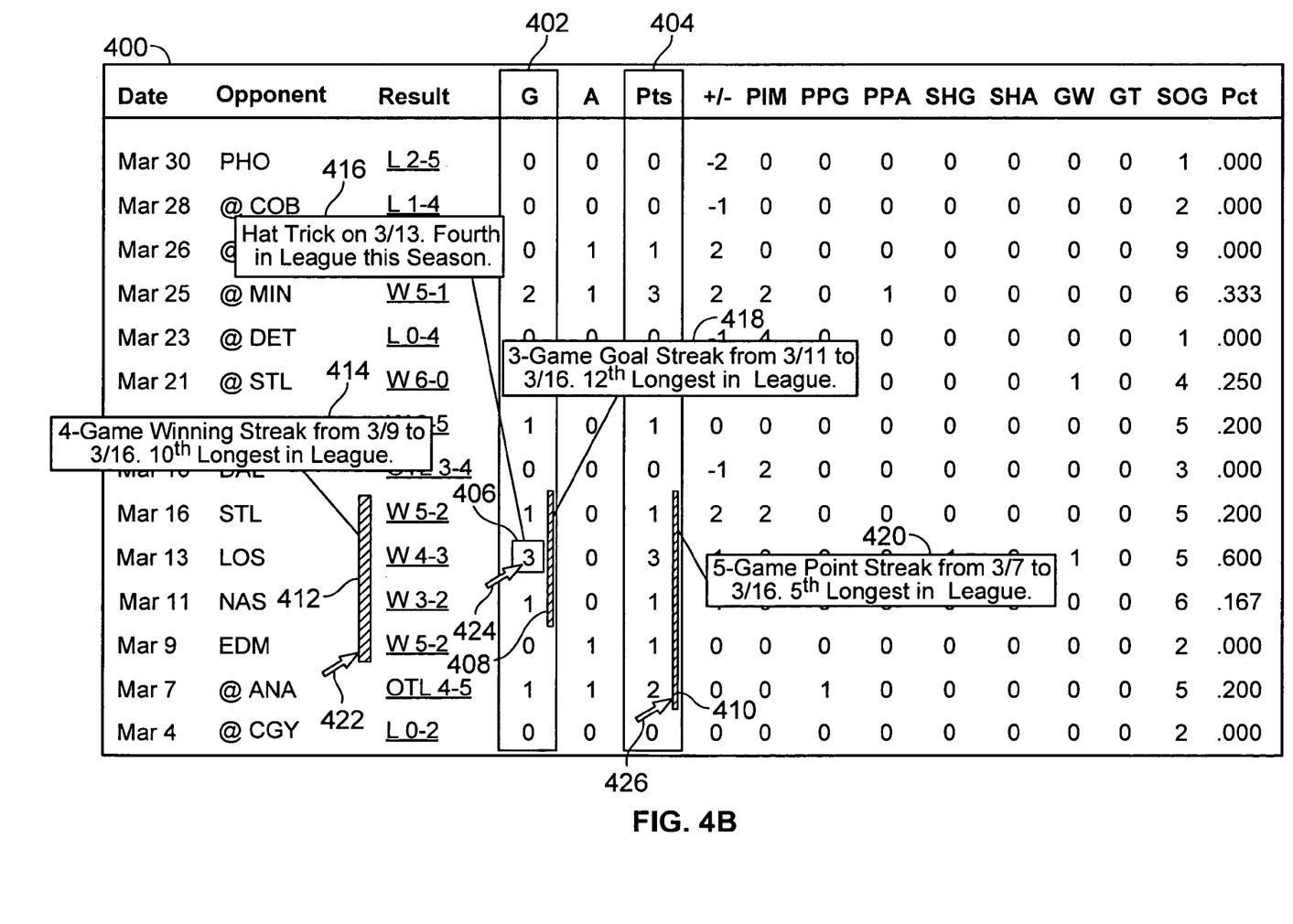
FIG. 4B is an illustrative drawing of streaks indicators, single-game achievement highlighting, and descriptions in accordance with some embodiments of the invention.

FIG. 4B is an illustrative drawing of streak indicators 412, 408, 410, single-game achievement highlighting 406, and descriptions 414, 416, 418, 420 in accordance with some embodiments of the invention. A data table user interface 400 includes a Result column 401, a Goal column 402, and a Points column 404. In one aspect, descriptive text is shown as a transient overlay over the data table in response to user selection of a value that is part of the streak, e.g., "1", "3", or "1" in the streak adjacent to the indicator 408, or of a portion of the streak indicator 408. Such user selection occurs when the mouse pointer 422 passes over a value that is part of a streak, or over the streak indicator 408, or over a single-game achievement value 406, or when the user otherwise selects the streak indicator 408 or a value in the streak. For example, the description 418 may appear when the user performs a mouse click or mouse over on one of the displayed data values adjacent to the streak indicator 408, or a mouse click or mouse over on the streak indicator 408, or otherwise selects a point on the indicator, or selects a point on one of the displayed data values. In one aspect, a mouse over occurs when the mouse pointer 424 passes over a displayed value or streak indicator. In another aspect, selection of a point may occur when a user clicks a mouse with the pointer positioned at the point, or when a user taps or touches a touch screen at the point.

The description typically disappears after a time period. The description is visually associated with the streak indicator, e.g., by an arrow, by a line, or by appearing in the vicinity of the streak indicator. The description includes the streak's length in time periods and a ranking of the streak's length relative to other streaks. While a five-game point streak is significant, it may only be the 20th longest point-streak in the current season and the 100th longest in the history of the league. This information can be collected, sorted, displayed to the user, and highlighted as shown in FIG. 4B. On mouse over on the streak, information can be displayed showing the length of the streak and how it ranks among other such streaks in the season.

The mouse pointer 422 is shown in multiple locations in FIG. 4B for illustrative purposes. In an actual user interface, the mouse pointer would appear in a single location, and one descriptive overlay would be visible at a time. When the mouse pointer 422 passes over the streak indicator 412 or over one of the four consecutive "W" values in the Result column 401, a description 414 that provides details about the four-game result streak is displayed. The description 414 states that the streak is a 4-game winning streak from 3/9 to 3/16, and that the streak is the 10th longest winning streak in the league in the current season. Similarly, when the mouse pointer 422 passes over the highlighted single-game achievement 406, a description 416 appears, stating that the achievement is a hat trick that occurred on 3/13, and that the hat trick is the fourth in the league in the current season. When the mouse pointer 422 passes over the streak indicator 408, a description 418 appears stating that the streak is a 3-game goal streak from 3/11 to 3/16, and is the 12th longest goal streak in the league in the current season. When the mouse pointer 422 passes over the streak indicator 410, a description 420 appears stating that the streak is a 5-game point streak from 3/7 to 3/16, and is the 5th longest point streak in the league in the current season.

Figure 5:
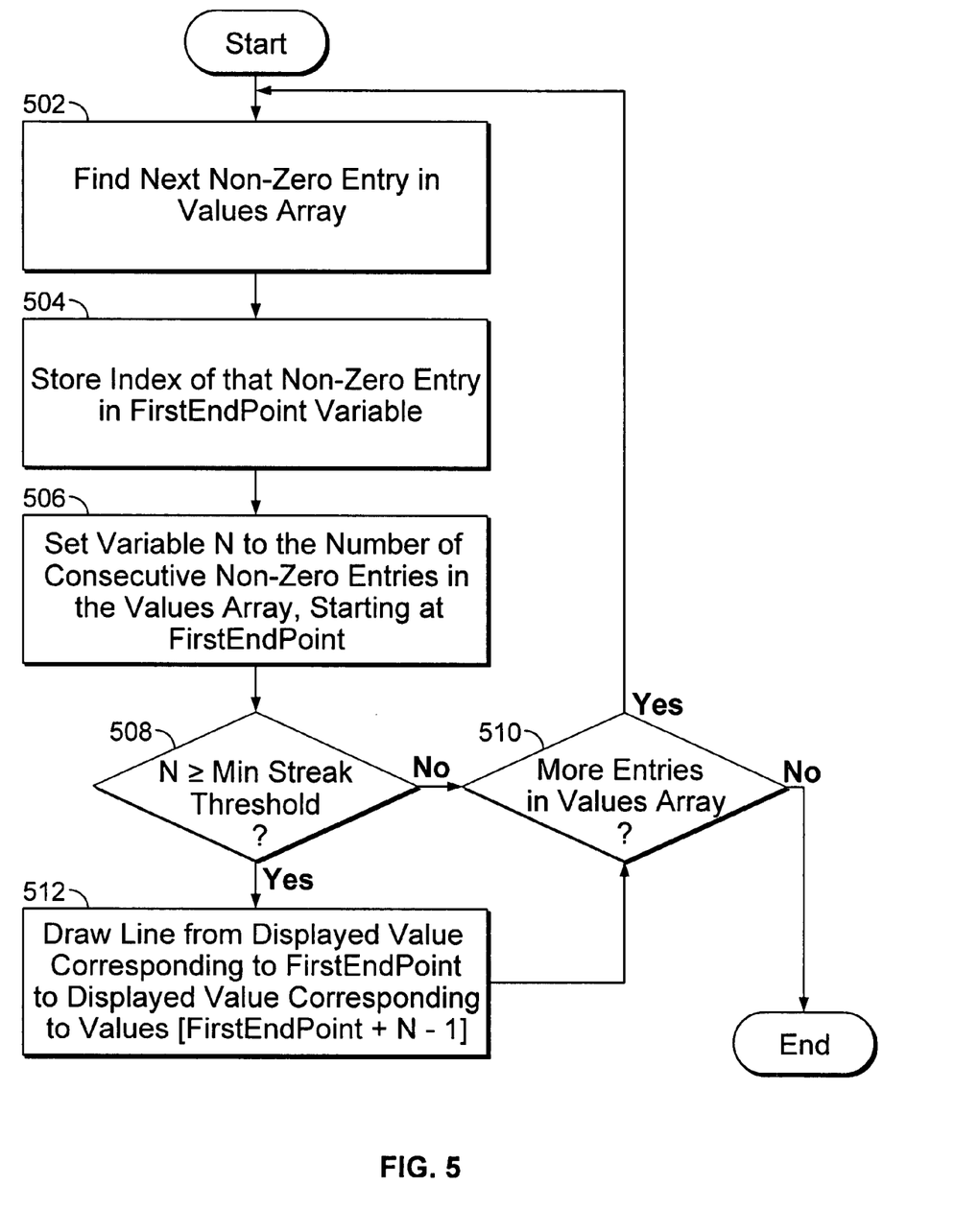
FIG. 5 is an illustrative flow diagram of a process for displaying a streak indicator in accordance with some embodiments of the invention.

FIG. 5 is an illustrative flow diagram of a process for displaying a streak indicator in accordance with some embodiments of the invention. The flow diagram receives a set of data values as input, e.g., the values in the Points column 112 of FIG. 1A. The input values are referred to as a values array, which is an ordered set of array values, i.e., entries. Each array entry is a value and has a corresponding index. The array entries are in the order that the values appear in the data table. The flow diagram generates a streak indicator for a performance condition in which non-zero data entries are to be included in a streak. Block 502 finds the next nonzero entry in the values array, which is assumed to have at least one nonzero entry (the flow diagram can be modified in a straightforward manner to halt if the array contains no matching, i.e., nonzero, entries). Initially, the next nonzero entry is the first nonzero entry in the array. Block 504 stores the index of the next nonzero entry in a variable named FirstEndpoint. Block 506 sets a variable named N to the number of consecutive nonzero entries in the values array, starting at the array index specified by FirstEndpoint. Block 508 determines if N is greater than or equal to a minimum threshold value named MinStreakThreshold. MinStreakThreshold is the minimum number of consecutive values that must satisfy the performance condition (i.e., be nonzero) to cause a streak indicator to be displayed. MinStreakThreshold may be 2, to allow 2-game streaks, or may be a larger value, which would increase the number of consecutive games required for a streak. If N is not greater than or equal to the minimum threshold value, block 510 determines if there are more entries in the values array that have not yet been processed. If so, control transfers back to block 502 to process the next entry. If there are no more entries, the process ends. If block 508 determines that N is greater than MinStreakThreshold, then N is the number of values in a valid streak, and block 512 draws a line from the displayed value corresponding to FirstEndpoint (values[FirstEndpoint] in array notation) to the displayed value corresponding to the last nonzero consecutive value in the array (values[FirstEndpoint+N−1] in array notation). Control then transfers to block 510, which checks for more entries as described above.

In another embodiment, the flow diagram can be modified to generate a streak indicator for data values that all have the same value by changing the nonzero condition to a condition that requires each data value to be equal to the previous data value. In still another embodiment, the flow diagram can be modified to include zero values in the streak, and exclude nonzero values, as would be done when counting a streak of shutouts. In a shutout, the number of goals allowed or runs allowed is 0, so an example of a shutout streak would be two or more consecutive zero values of values in a goals column. The flow diagram can be modified to generate streaks for zero values by changing the word "nonzero" to "zero" in blocks 502, 504, and 506.

Figure 6:
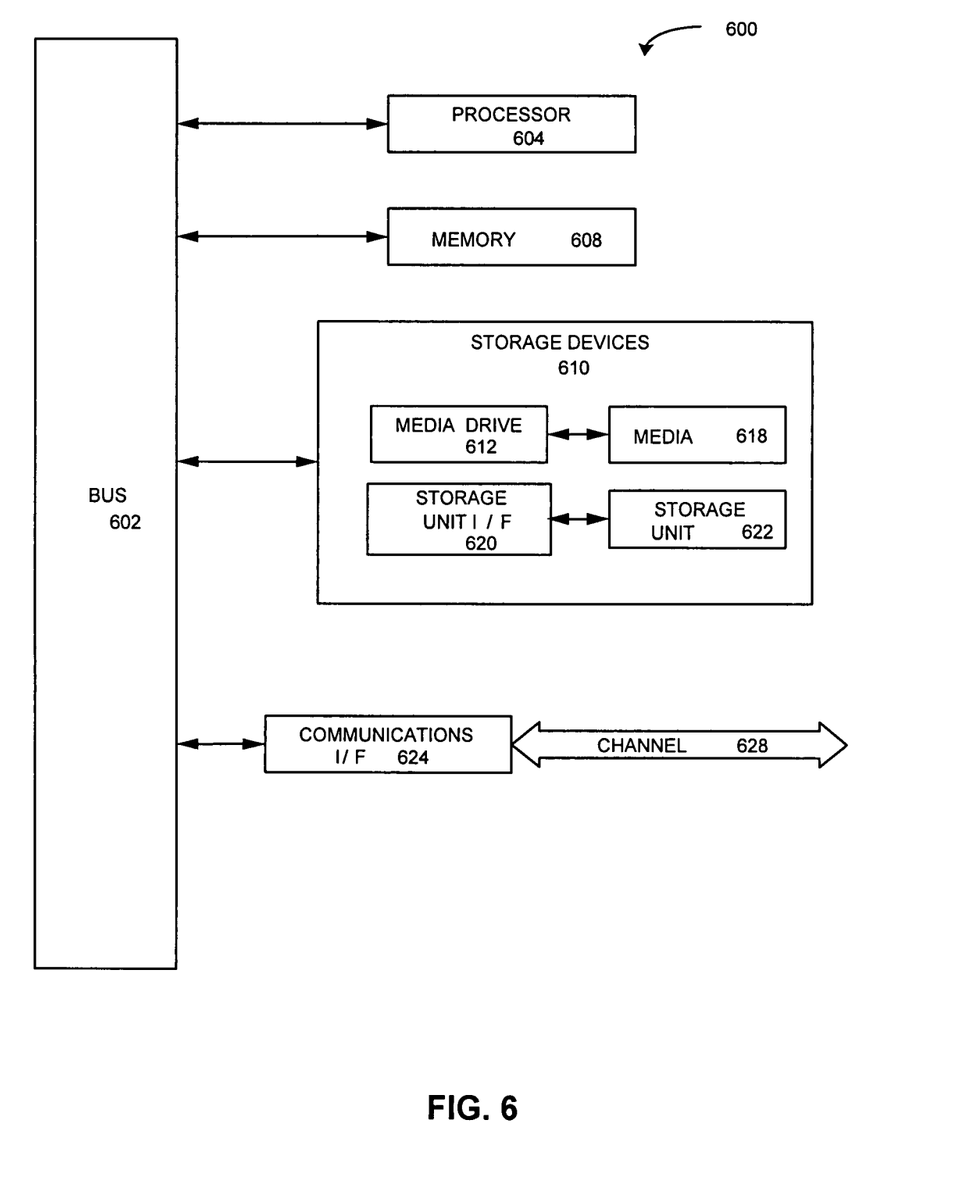
FIG. 6 is an illustrative drawing of an exemplary computer system that may be used in accordance with some embodiments of the invention.

FIG. 6 is an illustrative drawing of an exemplary computer system that may be used in accordance with some embodiments of the invention. FIG. 6 illustrates a typical computing system 600 that may be employed to implement processing functionality in embodiments of the invention. Computing systems of this type may be used in clients and servers, for example. Those skilled in the relevant art will also recognize how to implement the invention using other computer systems or architectures. Computing system 600 may represent, for example, a desktop, laptop or notebook computer, handheld computing device (PDA, cell phone, palmtop, etc.), mainframe, server, client, or any other type of special or general purpose computing device as may be desirable or appropriate for a given application or environment. Computing system 600 can include one or more processors, such as a processor 604. Processor 604 can be implemented using a general or special purpose processing engine such as, for example, a microprocessor, microcontroller or other control logic. In this example, processor 604 is connected to a bus 602 or other communication medium.

Computing system 600 can also include a main memory 608, such as random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory ("ROM") or other static storage device coupled to bus 602 for storing static information and instructions for processor 604.

The computing system 600 may also include information storage system 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 618, may include, for example, a hard disk, floppy disk, magnetic tape, optical disk, CD or DVD, or other fixed or removable medium that is read by and written to by media drive 614. As these examples illustrate, the storage media 618 may include a computer-readable storage medium having stored therein particular computer software or data.

In alternative embodiments, information storage system 610 may include other similar components for allowing computer programs or other instructions or data to be loaded into computing system 600. Such components may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a USB port), a PCMCIA slot and card, etc. Software and data transferred via communications interface 624 are in the form of signals which can be electronic, electromagnetic, optical or other signals capable of being received by communications interface 624. These signals are provided to communications interface 624 via a channel 628. This channel 628 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 608, storage device 618, or storage unit 622. These and other forms of computer-readable media may be involved in storing one or more instructions for use by processor 604, to cause the processor to perform specified operations. Such instructions, generally referred to as "computer program code" (which may be grouped in the form of computer programs or other groupings), when executed, enable the computing system 600 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 600 using, for example, removable storage drive 614, drive 612 or communications interface 624. The control logic (in this example, software instructions or computer program code), when executed by the processor 604, causes the processor 604 to perform the functions of the invention as described herein.

The methods disclosed herein allow a user to scan tables of numbers and quickly identify the important information. Aggregating and visually highlighting the streak information provides information that is not readily available in existing statistics displays.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A method comprising:
   displaying, by a computing device, an indicator that extends from a first position associated with a displayed first data value to a second position associated with a displayed second data value, the indicator indicating achievement of a performance objective in at least two consecutive sports games in which a sports entity participates,
   the display step based in part upon determining that the first data value and the second data value meet a predetermined value for a particular statistical measure in the at least two consecutive sports games; and displaying, by the computing device, details of the achievement of the performance objective when a user selects or passes a pointer over the first data value, the second data value, or the indicator.

2. The method of claim 1, wherein the first data value and the second data value meet the predetermined value if the first data value and the second data value are greater than the predetermined value.

3. The method of claim 1, wherein the first data value and the second data value meet the predetermined value if the first data value and the second data value are equal to the predetermined value.

4. The method of claim 1, wherein the indicator comprises a line segment extending from adjacent the first data value to adjacent the second data value.

5. The method of claim 1, wherein the set of displayed data values is displayed in a table having columns and rows, wherein displaying an indicator comprises the step of:
displaying a line segment adjacent to the column, wherein the line segment extends from adjacent the first data value to adjacent the second data value.

6. The method of claim 1, wherein the set of displayed data values comprises data in a table having columns and rows, wherein displaying an indicator comprises the step of:
displaying a line segment adjacent to the row, wherein the line segment extends from adjacent the first data value to adjacent the second data value.

7. The method of claim 1, wherein displaying an indicator comprises varying the visual appearance of the first data value and the second data value to distinguish the first data value and the second data value from other data values.

8. The method of claim 1, wherein displaying an indicator comprises varying the background color of the first data value and of the second data value to distinguish the first data value and the second data value from other data values.

9. The method of claim 1, wherein the
displaying of the details comprises displaying a length in time periods and a ranking of the length relative to other streaks.

10. The method of claim 1, further comprising:
highlighting at least one data value, wherein the at least one data value represents the sports entity's performance according to a particular statistical measure in a sports event, and the at least one data value meets the predetermined value.

11. The method of claim 1, wherein highlighting comprises varying the visual appearance of the at least one data value based upon the performance objective.

12. The method of claim 1 wherein highlighting comprises varying the color of the at least one data value based upon the performance objective.

13. A computing device comprising:
a processor;
a storage medium for tangibly storing thereon instructions for execution by the processor, the instructions comprising:
displaying, by the processor, an indicator that extends from a first position associated with a displayed first data value to a second position associated with a displayed second data value, the indicator indicating achievement of a performance objective in at least two consecutive sports games in which a sports entity participates, the two consecutive sports games comprising a first sports game and a second sports game,
wherein the first data value represents the sports entity's performance in the first sports game, and the second data value represents the sports entity's performance in the second sports game, and
the display step based in part upon determining that the first data value and the second data value meet a predetermined value for a particular statistical measure in the at least two consecutive sports games; and
displaying, by the processor, details of the achievement of the performance objective when a user selects or passes a pointer over the first data value, the second data value, or the indicator.

14. The computing device of claim 13, wherein the displaying of the details further comprises displaying a length in time periods and a ranking of the length relative to other streaks.

15. The computing device of claim 13, wherein the displaying of the details further comprises displaying the details in response to selection of a point on the indicator, selection of a point on one of the displayed data values, or a combination thereof.

16. A non-transitory computer-readable storage medium comprising instructions for execution by a processor for providing a user interface for displaying sports streaks, the instructions for causing performance of a method comprising the steps of:
displaying, by the processor, an indicator that extends from a first position associated with a displayed first data value to a second position associated with a displayed second data value,
the display step based in part upon determining that the first data value and the second data value meet a predetermined value for a statistical measure in two consecutive sports games; and
displaying, by the processor, details of the achievement of the performance objective when a user selects or passes a pointer over the first data value, the second data value, or the indicator.

17. The non-transitory computer-readable storage medium of claim 16, wherein the first position is within a predetermined distance of the first data value and the second position is within a predetermined distance of the second data value.

18. The non-transitory computer-readable storage medium of claim 16, the method further comprising the step of:
highlighting at least one data value, wherein the at least one data value represents a sports entity's performance according to a particular statistical measure in a sports event, and the at least one data value meets a predetermined value.

19. A server comprising:
a processor;
a storage medium for tangibly storing thereon program logic for execution by the processor, the program logic comprising:
transmitting logic executed by the processor for transmitting a graphical user interface to a client device, the graphical user interface configured to:
display, by the client device, an indicator that extends from a first position associated with a displayed first data value to a second position associated with a displayed second data value, the indicator indicating achievement of a performance objective in at least two consecutive sports games in which a sports entity participates,
the display step based in part upon determining that the first data value and the second data value meet a predetermined value for a particular statistical measure in the at least two consecutive sports games; and display, by the client device, details of the achievement of the performance objective when a user selects or passes a pointer over the first data value, the second data value, or the indicator.

* * * * *